United States Patent [19]

Tsai et al.

[11] Patent Number: 5,069,468
[45] Date of Patent: Dec. 3, 1991

[54] COLLAPSIBLE BICYCLE

[76] Inventors: Shu-Huey Tsai; Duan-Huey Tsai, both of 446, Chien-Kuo I Road, Sam-Min District, Kao-Hsiung City, Taiwan

[21] Appl. No.: 567,166

[22] Filed: Aug. 14, 1990

[51] Int. Cl.⁵ ............................................. B62K 15/00
[52] U.S. Cl. .................................... 280/278; 280/287; 280/639
[58] Field of Search ................ 280/274, 278, 287, 639

[56] References Cited

U.S. PATENT DOCUMENTS

4,582,335 4/1986 Paioli et al. ...................... 280/287 X
4,824,131 4/1989 Thay ................................... 280/278

Primary Examiner—Charles A. Marmor
Assistant Examiner—Alan M. Kagen
Attorney, Agent, or Firm—Morton J. Rosenberg; David I. Klein

[57] ABSTRACT

This invention relates to a collapsible bicycle and in particular to one including a top tube, a seat tube pivotally connected with one end of the top tube, a down tube pivotally connected at the lower end with a lower end of the seat tube and being collapsible at the intermediate portion, a reinforcing tube pivotally connected at the upper end with an intermediate portion of the top tube and having at the lower end two rollers and a spring-loaded positioning member adapting to groove and the recess of the down tube respectively, a head tube fixedly connected with down tube and pivotally connected with the top tube, a handlebar composed of a major bar and an auxiliary bar, and two crank arms pivotally connected with an axle of the bicycle and being able to be folded in alignment with center of the axle.

1 Claim, 8 Drawing Sheets

COLLAPSIBLE BICYCLE

BACKGROUND OF THE INVENTION

Bicycle is an open, two wheeled vehicle popular in many countries of the world, and used for pleasure riding, light delivery, racing, and in many areas as a major means of transport. Although the bicycle is by definition a two-wheeler, there are other forms with multiple wheels and seats: tandems for two persons, triplets for three persons, quadruplets for four persons, quintuplets for five persons . . . etc. Recently, a so-called collapsible bicycle has been developed to enhance the mobility thereof, but it is too heavy and inconvenient to fold.

It is, therefore, an object of the present invention to provide a collapsible bicycle which may obviate and mitigate the above-mentioned drawbacks.

SUMMARY OF THE INVENTION

This invention relates to an improved collapsible bicycle.

It is the primary object of the present invention to provide a collapsible bicycle which is easily folded.

It is another object of the present invention to provide a collapsible bicycle which is compact in size.

It is still another object of the present invention to provide a collapsible bicycle which is simple in construction.

It is still another object of the present invention to provide a collapsible bicycle which is durable in structure.

Other objects and merits and a fuller understanding of the present invention will he obtained by those having ordinary skill in the art when the following detailed description of the preferred embodiment is read in conjunction with the accompanying drawings.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is understood that the phraseology or terminology employed herein is for the purpose of description and not of limitation.

Figure 1:
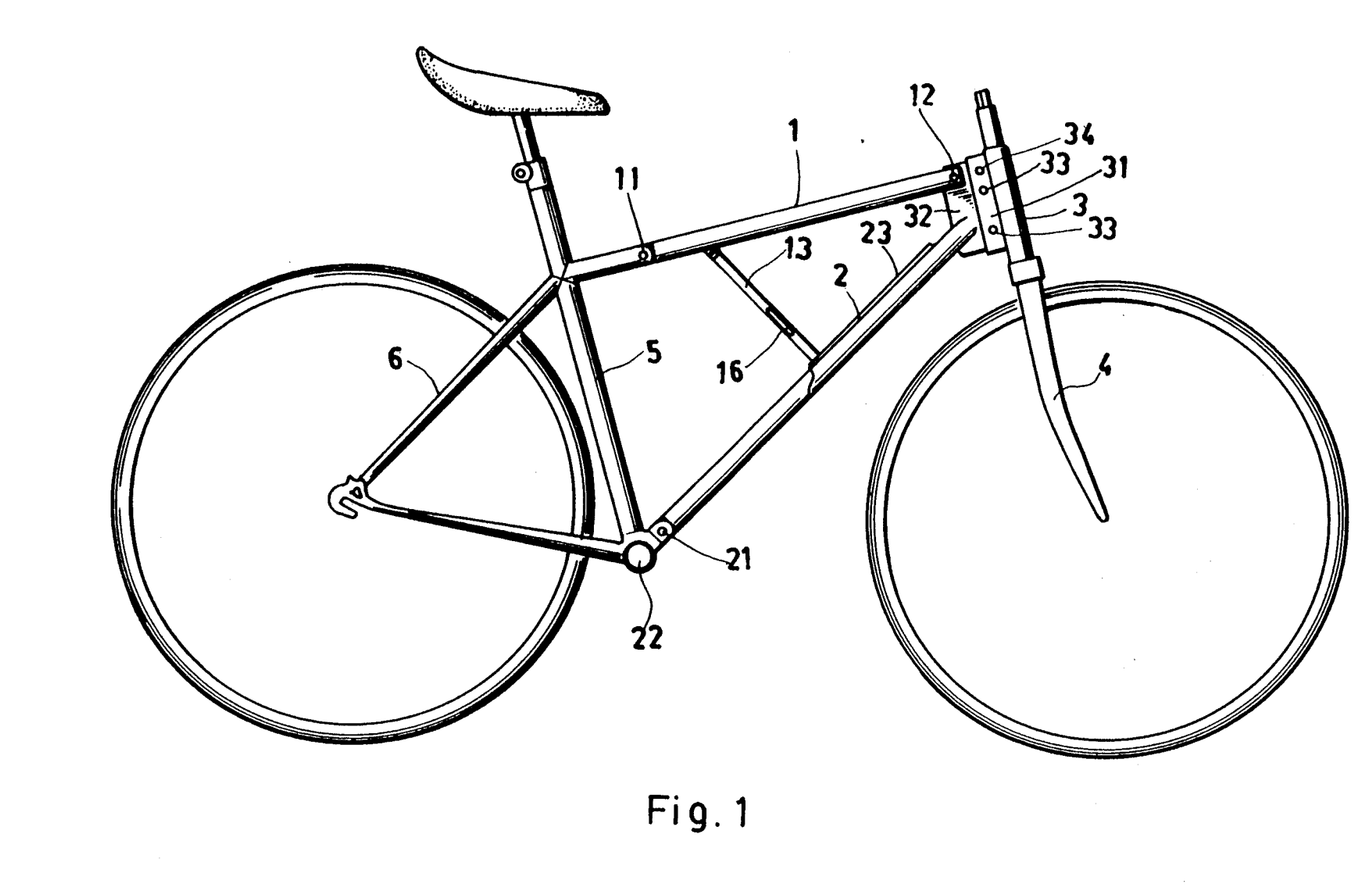
FIG. 1 is a front view of a collapsible bicycle according to the present invention.
Figure 2:
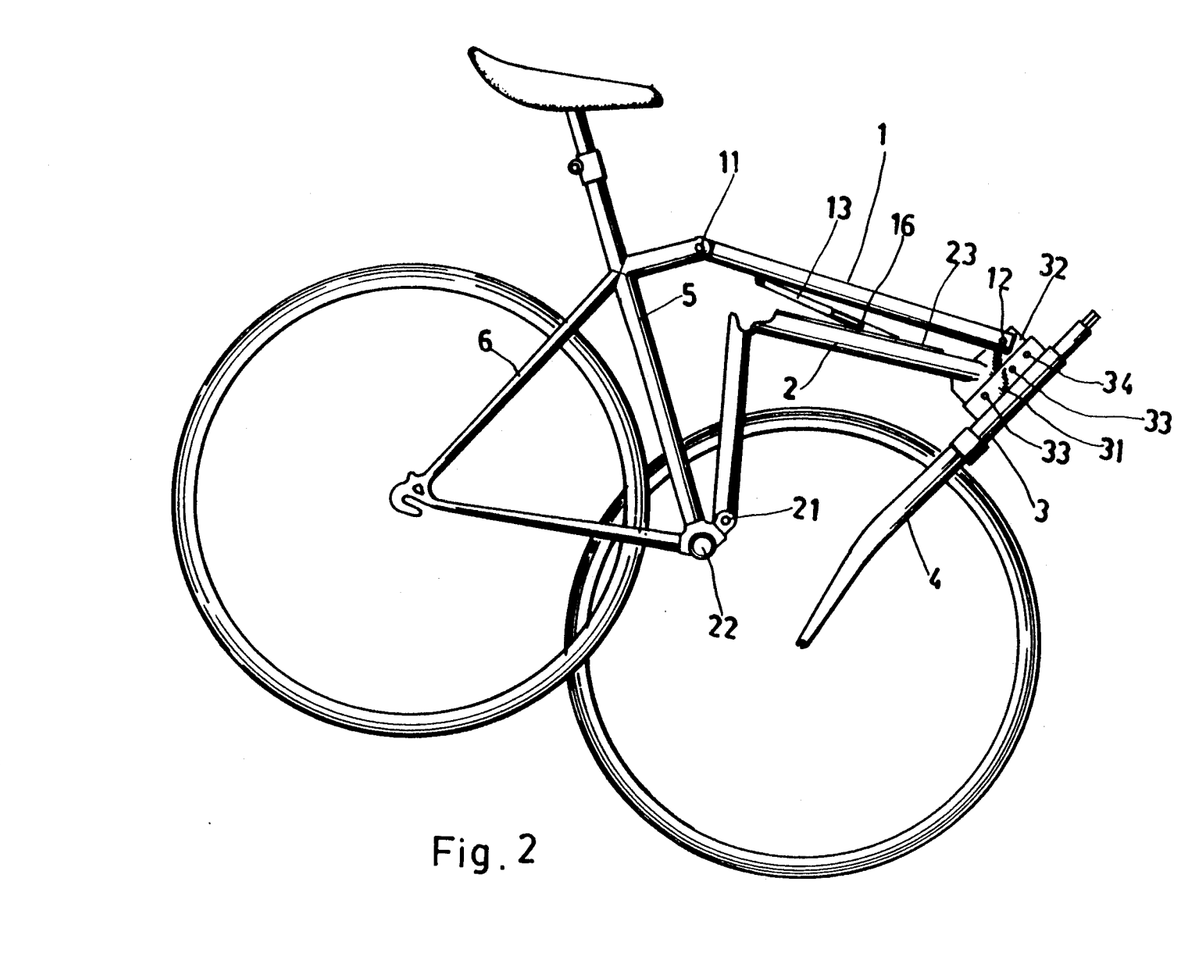
FIG. 2 shows how the collapsible bicycle is folded.
Figure 3:
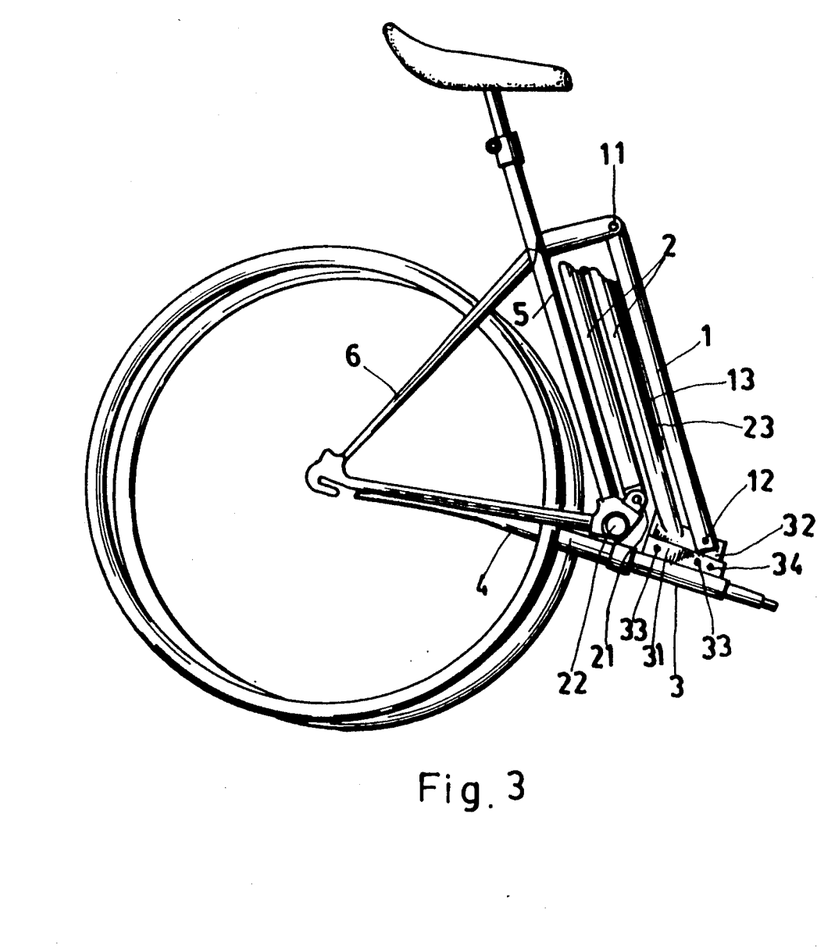
FIG. 3 shows the state of the collapsible bicycle having already been folded.
Figure 4:
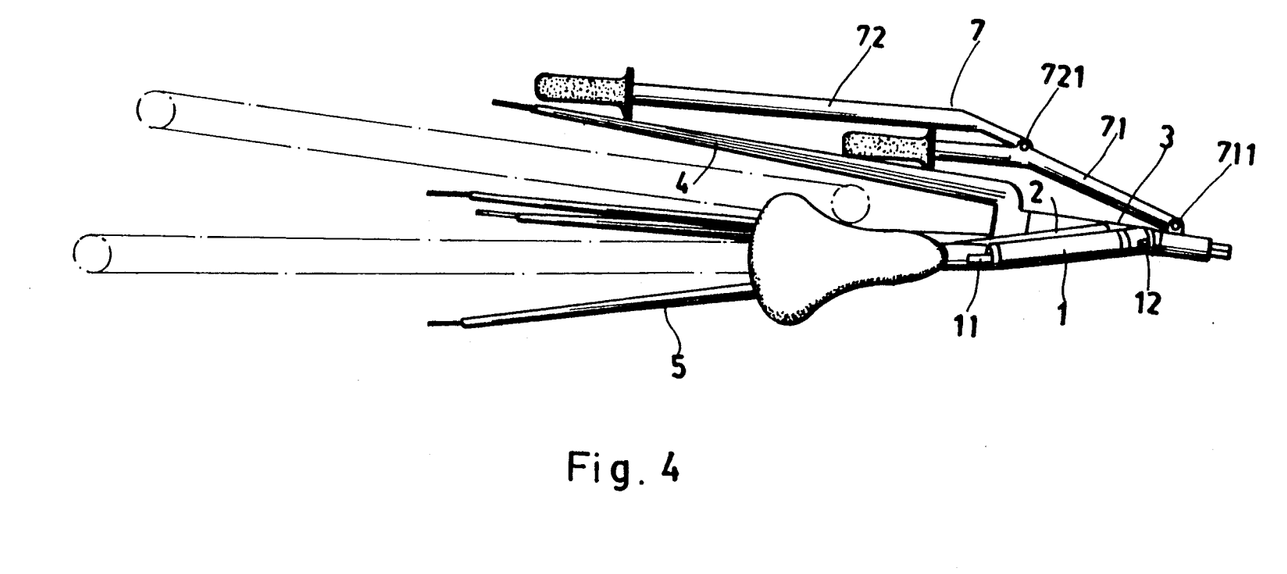
FIG. 4 is a top view of the collapsible bicycle having already been folded.
Figure 5:
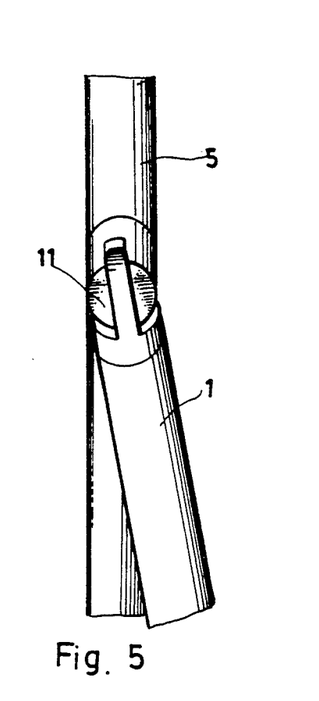
FIG. 5 shows the structure of the connector for the top tube.
Figure 6:
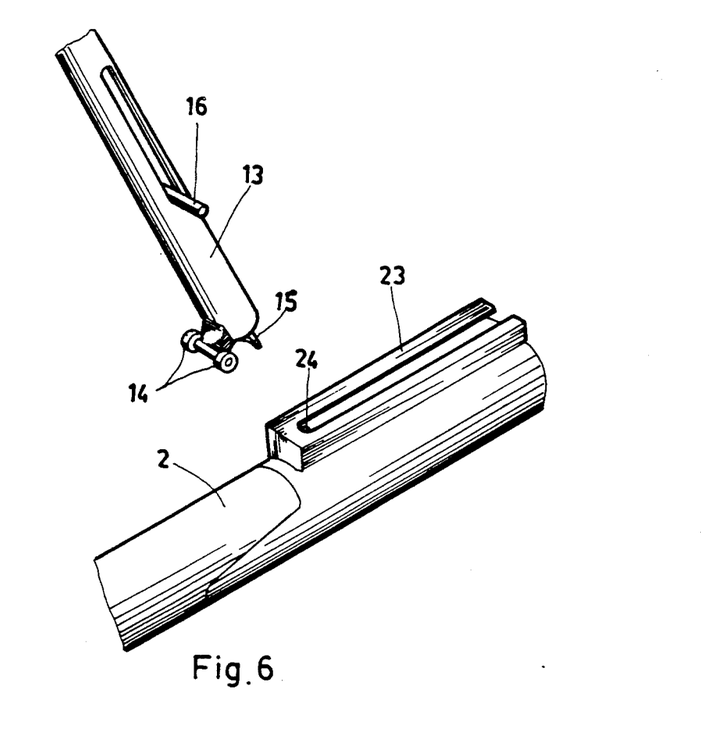
FIG. 6 shows the structure of the reinforcing tube and the down tube.
Figure 7:
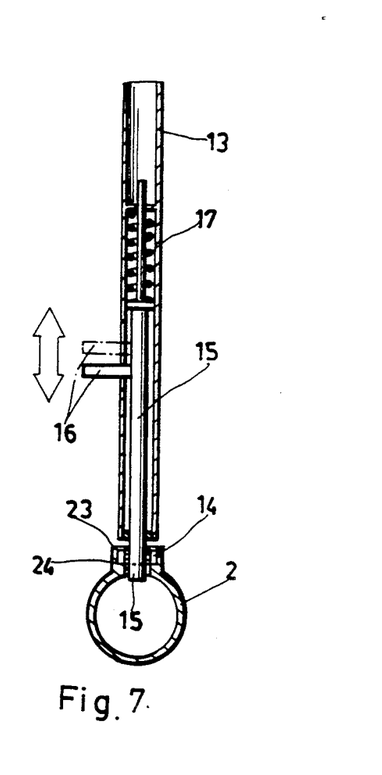
FIG. 7 is a sectional view illustrating the connection of the reinforcing tube and the down tube.

With reference to the drawings and in particular to FIG. 1, the collapsible bicycle according to the present invention mainly comprises a top tube 1, a down tube 2, a head tube 3, a front fork 4, a seat tube 5, a rear fork 6, a handlebar 7 and two crank arms 8. The connection among the above-mentioned components is well known in the art and has no need to be described here in detail. As illustrated in FIGS. 2 and 3, the top tube 1 is a collapsible elongated member with movable joints 11 and 12 at the end for connecting the head tube 3 and the seat tube 5 respectively. The structure of the joints 11 and 12 is shown in FIG. 5. A reinforcing tube 13 is pivoted on the intermediate portion of the top tube 1, which is provided with two rollers 14 and a positioning member 15 having a released rod extending out of the reinforcing tube 13 (see FIGS. 6 and 7). A compressed spring 17 is used to urge the positioning member 15 to go downwards.

The down tube 2, which may be folded at the middle portion, is fixedly connected with the head tube 3 at the upper end and an axle tube 5 at the lower end via a movable joint 21. Further, the down tube 2 has a longitudinal groove 23 for receiving the rollers 14, which is formed with a recess 24 so that when the reinforcing tube 13 is moved downwards to the lower end of the groove 23 of the down tube 2, the positioning member 15 will engage with the recess 24 thereby keeping the reinforcing tube 13, the top tube 1 and the down tube 2 in position.

Figure 8:
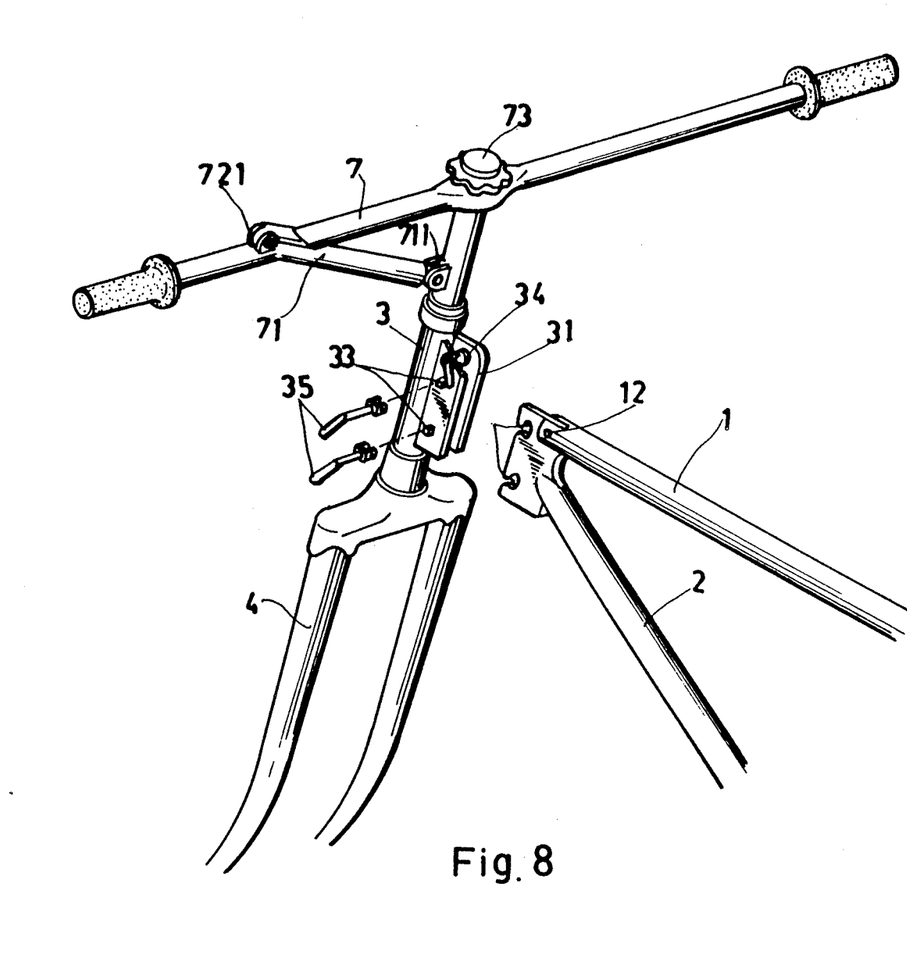
FIG. 8 shows how to dismantle the head tube from the bicycle.

Looking now at FIG. 8, the head tube 3 has a seat 31 for engaging with the top tube 1 and the down tube 2. The seat 31 is formed with notches 32 for engaging screws 33 extending through the head tube 3 and kept at a fixed position by knobs 35.

Figure 9:
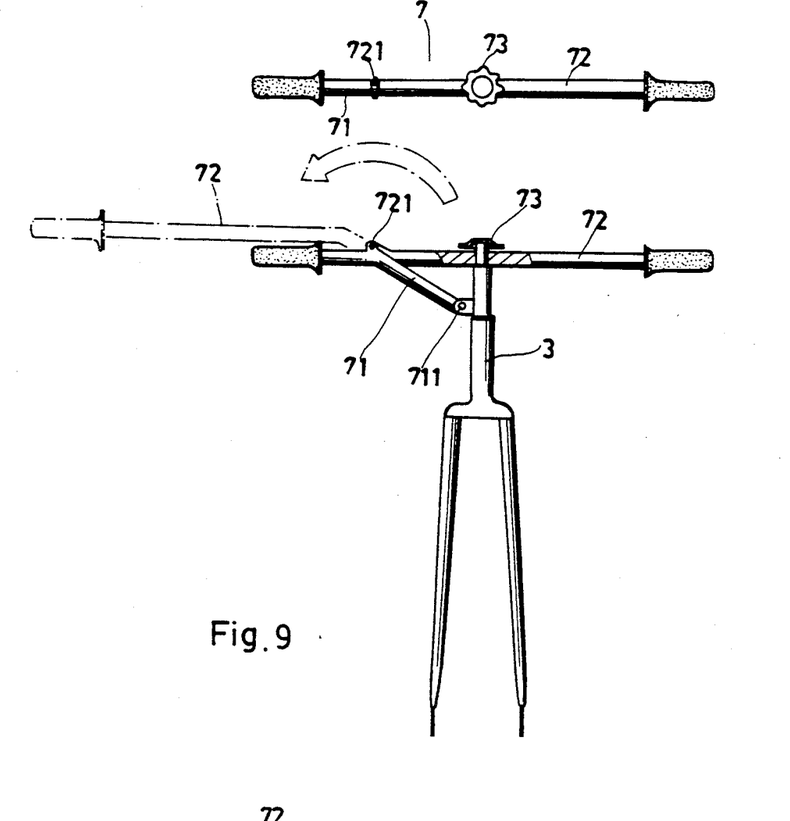
FIG. 9 shows the structure of the handlebar.
Figure 10:
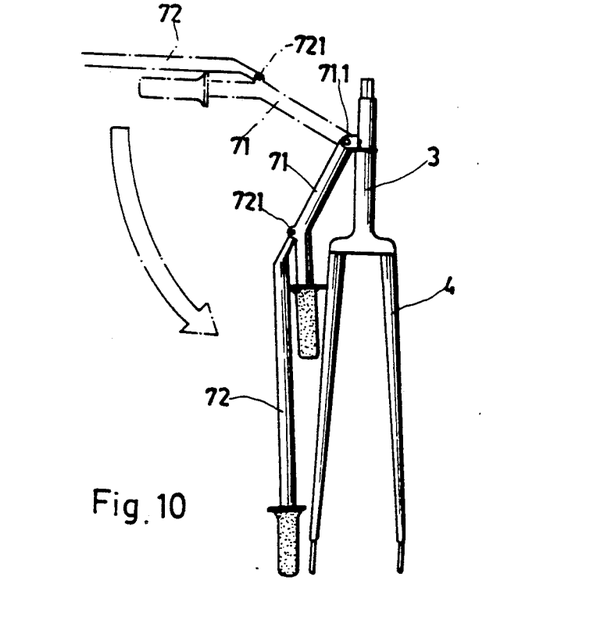
FIG. 10 shows how to fold the handlebar.

The handlebar 7 (see FIGS. 8. 9, 10) is composed of a major bar 72 and an auxiliary bar 71. The auxiliary bar 71 is fixedly connected with the head tube 3 by a movable joint 711, while the major bar 72 is connected with the auxiliary bar 71 by a movable joint 721 at the end and with the head tube 3 at the intermediate portion. A nut 73 is engaged with the top end of the head tube 3 so as to fixedly connect the handlebar 7 with the head tube 3. Hence, the major bar 72 may be folded towards the auxiliary bar 71 and may be further folded together with the auxiliary bar 71 to a position adjacent the front fork 4 as shown in FIG. 10.

Figure 11:
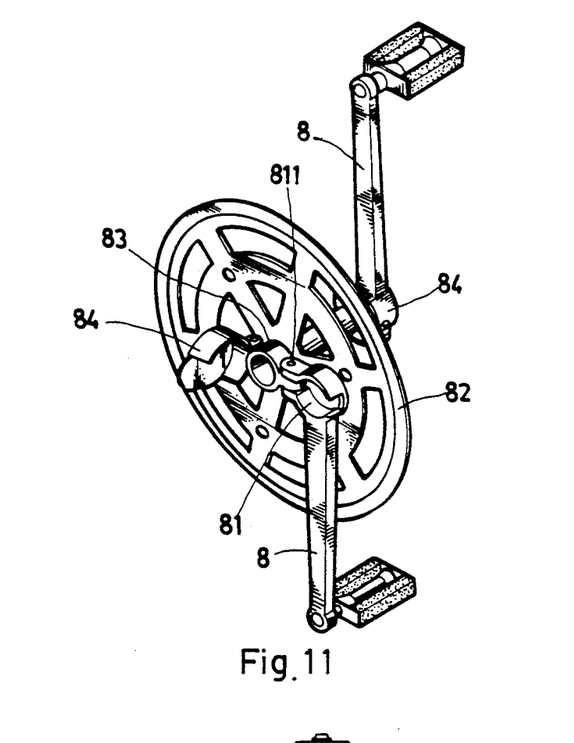
FIG. 11 shows the structure of the crank arm.
Figure 12:
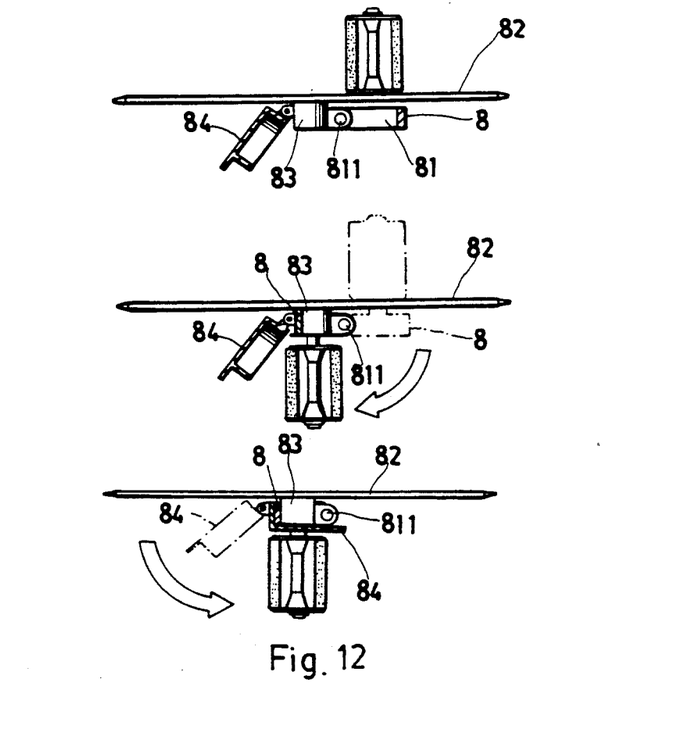
FIG. 12 shows how to fold the crank arm.

As illustrated in FIG. 11, the crank arm 8 is connected with the axle 83 via a movable joint 811 and has a recess 81 at the inner end. A cover 84 is pivotally connected at the other side of the axle 83 for keeping the folded crank arm 8 in place.

Referring to FIGS. 6, 7, 2 and 3, in order to fold the bicycle, front fork 4 is rotated slightly within head tube 3 to angularly offset the front and rear wheels. Initially, reinforcing tube 16 is locked to down tube 2 when positioning member 15 is located within recess 24 of tube 2 shown in FIG. 7. Pin 16 is pulled upwardly to remove positioning member 15 from recess 24, shown in FIGS. 6 and 7. Reinforcing tube 13 slides within groove 23 by action of rollers 14. The rear wheel may be lifted to allow rotation about pivot joints 11 and 21. The rear wheel portion may then be moved forward into a position shown in FIG. 3.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A collapsible bicycle comprising:

a top tube;

a seat tube pivotally connected to one end of said top tube;

a down tube pivotally connected at a lower end thereof with a lower end of said seat tube being collapsible at an intermediate portion thereof, said down tube having a longitudinal groove formed therein with a recess formed within said lower end;

a reinforcing tube pivotally connected at an upper end thereof with an intermediate portion of said top tube and having at the lower end two rollers and a spring-loaded positioning member adapted for displacement within the groove and the recess of said down tube respectively;

a head tube fixedly connected to said down tube and pivotally connected to said top tube;

a handlebar including a major bar and an auxiliary bar, said major bar being fixedly connected to said head tube and pivotally connected to said auxiliary bar, said major bar being pivotally connected to said head tube; and a pair of crank arms pivotally connected to an axle of said bicycle, said crank arms being foldable in alignment with a center of said axle.

* * * * *